(12) United States Patent
Ran et al.

(10) Patent No.: US 8,248,439 B2
(45) Date of Patent: Aug. 21, 2012

(54) BACKLIGHT CONTROLLER FOR DRIVING LIGHT SOURCES

(75) Inventors: Kaiping Ran, Fremont, CA (US); Da Liu, Milpitas, CA (US); Yung Lin Lin, Palo Alto, CA (US)

(73) Assignee: O2Micro, Inc, Santa Clara, CA (US)

( * ) Notice: Subject to any disclaimer, the term of this patent is extended or adjusted under 35 U.S.C. 154(b) by 0 days.

(21) Appl. No.: 13/094,384

(22) Filed: Apr. 26, 2011

(65) Prior Publication Data

US 2011/0221795 A1 Sep. 15, 2011

Related U.S. Application Data

(62) Division of application No. 12/075,021, filed on Mar. 7, 2008, now abandoned.

(51) Int. Cl.
*G09G 5/10* (2006.01)
*G09G 3/00* (2006.01)
*G09G 3/32* (2006.01)

(52) U.S. Cl. ............ 345/690; 345/30; 345/82; 345/102; 345/204; 362/555; 362/559; 362/561; 362/97.2; 362/612; 323/212; 327/131

(58) Field of Classification Search ........................ None
See application file for complete search history.

(56) References Cited

U.S. PATENT DOCUMENTS

| 7,471,287 | B2 * | 12/2008 | Chen et al. ................... 345/212 |
| 7,777,704 | B2 | 8/2010 | S |
| 7,847,783 | B2 | 12/2010 | Liu |
| 2008/0100561 | A1 * | 5/2008 | Price et al. ................... 345/102 |
| 2008/0284714 | A1 * | 11/2008 | Wu et al. ....................... 345/102 |
| 2009/0051629 | A1 * | 2/2009 | Price et al. ..................... 345/82 |

* cited by examiner

*Primary Examiner* — William Boddie
*Assistant Examiner* — Alecia D English

(57) ABSTRACT

A backlight controller for driving multiple light emitting diode (LED) strings includes feedback circuitry, phase array circuitry, and encoder circuitry. The feedback circuitry generates multiple feedback signals indicative of currents flowing through the LED strings respectively. The encoder circuitry generates a code signal indicative of a total number of operative LED strings among the multiple LED strings based on the feedback signals. The phase array circuitry generates multiple saw tooth signals according to the code signal. A phase shift amount between two adjacent signals of the saw tooth signals is determined by the total number of the operative LED strings. The phase array circuitry compares each of the saw tooth signals with a dimming control signal to generate multiple phase shift signals so as to respectively control the operative LED strings.

17 Claims, 6 Drawing Sheets

BACKLIGHT CONTROLLER FOR DRIVING LIGHT SOURCES

RELATED APPLICATION

This application is a divisional of the U.S. patent application, Ser. No. 12/075,021, entitled "Backlight Controller for Driving Light Sources", filed on Mar. 7, 2008, which is fully incorporated herein by reference in its entirety.

BACKGROUND

Light emitting diodes (LEDs) become popular in the lighting industry, particularly for backlighting the liquid crystal displays (LCDs), street lighting, and home appliances. The advantages of using LEDs for lighting equipment includes power saving, smaller size and no use of hazardous materials compared to fluorescent lighting devices. In addition, the power supply for LEDs usually operates with relatively low voltage which can avoid high-voltage potential issues associated with power supply for fluorescent lamps. For example, a cold cathode fluorescent lamp (CCFL) may require more than 1000 Volts AC to start and operate. A single LED may only require about 1 to 4 Volts DC to operate.

To provide sufficient brightness, a display system or lighting apparatus may require many LEDs in order to produce comparable brightness as generated by fluorescent lamps or incandescent lamps. The brightness of the display system can vary according to users' adjustments or environmental conditions. The challenge of using LEDs for lighting system can include optimization of the brightness according to environment conditions and balancing currents in the LEDs to extend the operational life time of LEDs.

SUMMARY

In one embodiment, a backlight controller for driving multiple light emitting diode (LED) strings includes feedback circuitry, phase array circuitry, and encoder circuitry. The feedback circuitry generates multiple feedback signals indicative of currents flowing through the LED strings respectively. The encoder circuitry generates a code signal indicative of a total number of operative LED strings among the multiple LED strings based on the feedback signals. The phase array circuitry generates multiple saw tooth signals according to the code signal. A phase shift amount between two adjacent signals of the saw tooth signals is determined by the total number of the operative LED strings. The phase array circuitry compares each of the saw tooth signals with a dimming control signal to generate multiple phase shift signals so as to respectively control the operative LED strings.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present disclosure provide an adaptive backlight controller in a display system for driving a plurality of light source strings, e.g., LED strings. Advantageously, the backlight controller can provide automatic phase shift adjustments according to a total number of light source strings in operation such that the burst-mode dimming control can be optimized, in one embodiment. If the display system has N strings of LEDs in operation, then an amount of the phase shift between currents of two adjacent operative LED strings can be automatically adjusted to 360/N degrees. For example, when the display system has six strings of LEDs in operation, the amount of phase shift between two adjacent operative LED strings is 60 degrees. Similarly, if the display system has 5, 4, 3 and 2 strings of LEDs in operation, the corresponding phase shift between two adjacent operative LED strings can be automatically adjusted to 72 degrees, 90 degrees, 120 degrees, and 180 degrees respectively. As a result, the power line ripple current can be further reduced during the burst-mode dimming control compared to a non-adaptive phase shift burst-mode dimming control. Advantageously, the flickering problem in LCD displays caused by the power line ripple current can be reduced or eliminated.

Figure 1:
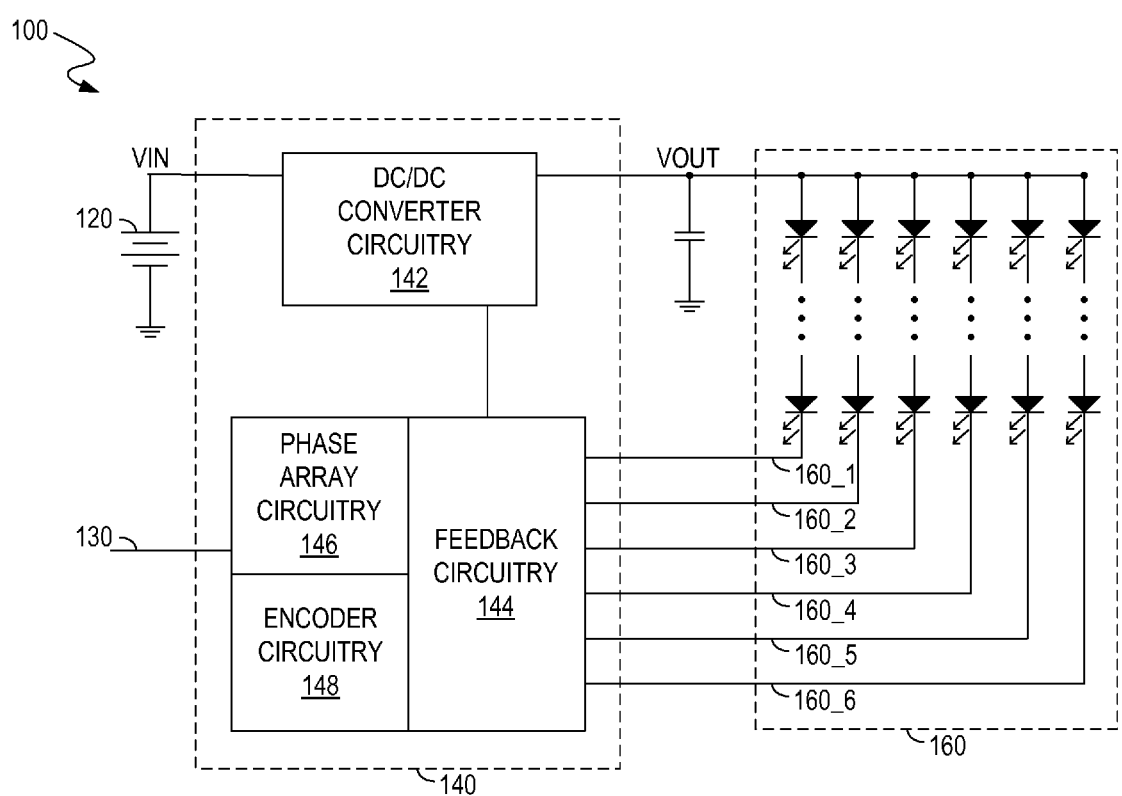
FIG. 1 illustrates an exemplary block diagram of a display system, in accordance with one embodiment of the present invention.

FIG. 1 illustrates an exemplary block diagram of a display system 100, in accordance with one embodiment of the present invention. The display system 100 may include a light source array 160 and a backlight controller 140. The light source array 160 can form at least part of, for example, a backlight for a Liquid Crystal Display (LCD) panel. In one embodiment, the light source array 160 includes a plurality of light source strings 160_1-160_6. Although six light source strings are shown in the example of FIG. 1, any number of light source strings can be included in the light source array 160. The plurality of light source strings 160_1-160_6 can be a plurality of light emitting diode (LED) strings and each string 160_1-160_6 may include a plurality of series-connected LEDs. LED strings 160_1-160_6 can be coupled together in parallel and to a power source 120, e.g., a battery pack, via the backlight controller 140. The backlight controller 140 controls power from the power source 120 for driving the plurality of LED strings 160_1-160_6. In one embodiment, the backlight controller 140 may include one or more integrated circuits. As used in any embodiment herein, an "integrated circuit" means a semiconductor device and/or microelectronic device, such as a semiconductor integrated circuit chip.

The backlight controller 140 can include a DC/DC converter circuitry 142 capable of receiving power from the power source 120 and generating a DC power VOUT. Exemplary DC/DC converter circuitry 142 may include buck, boost, buck-boost, Sepic, Zeta and/or other known or after-developed circuit topologies.

In one embodiment, the backlight controller 140 further includes a feedback circuitry 144 coupled to the plurality of LED strings 160_1-160_6 and for generating a plurality of feedback signals 144_1-144_6 (not shown in FIG. 1 for purposes of brevity and clarity) indicative of a plurality of currents flowing through the plurality of LED strings 160_1-160_6 respectively. In one embodiment, the feedback circuitry 144 can adjust the currents respectively flowing through LED strings 160_1-160_6 to a predetermined current level. The feedback circuitry 144 is further capable of balancing the currents flowing through the plurality of LED strings 160_1-160_6 respectively. More specifically, the feedback circuitry 144 is capable of comparing a current flowing through one LED string to currents flowing through other LED strings. For example, the current flowing through the LED string 160_1 can be adjusted based upon a difference between the current flowing through the LED string 160_1 and the current flowing though another LED string. The feedback circuitry 144 can also be coupled to the DC/DC converter circuitry 142 for controlling the power delivered to LED strings 160_1-160_6.

Dimming control for adjusting the output power to the plurality of LED strings 160_1-160_6 can be implemented through a burst-mode control. An external dimming control signal (DIM) 130 can be input to the backlight controller 140 as a source of burst-mode dimming control signal. The dimming control signal 130 can be a digital signal (e.g., a pulse width modulation signal) or an analog voltage signal.

In one embodiment, the backlight controller 140 further includes a phase array circuitry 146 for receiving the dimming control signal 130 and for receiving a code signal 210 (not shown in FIG. 1 for purposes of brevity and clarity) indicative of a total number N of the operative LED strings among the plurality of LED strings 160_1-160_6. In one embodiment, the term "operative LED strings" or "LED strings in operation" in the present disclosure means that the LED strings are in normal operation and are not damaged or disconnected. The phase array circuitry 146 can generate a plurality of phase shift signals (not shown in FIG. 1 for purposes of brevity and clarity) according to the code signal 210. Advantageously, a total number of the phase shift signals generated by the phase array circuitry 146 can be equal to the total number N of the operative LED strings, and a phase shift between two adjacent phase shift signals is adjusted according to the total number N of the operative LED strings, in one embodiment.

The backlight controller 140 can further include an encoder circuitry 148 coupled to the phase array circuitry 146 and for receiving the plurality of phase shift signals from the phase array circuitry 146 and for receiving the plurality of feedback signals 144_1-144_6 from the feedback circuitry 144. The encoder circuitry 148 can provide the code signal 210 and generate a plurality of pulse width modulation (PWM) signals (not shown in FIG. 1 for purposes of brevity and clarity) to respectively control the operative LED strings. Advantageously, a phase shift amount between currents of two operative adjacent LED strings can be adjusted according to the total number N of the operative LED strings among LED strings 160_1-160_6. More specifically, the phase shift amount between currents of two operative adjacent LED strings can be equal to 360/N degrees.

Figure 2A:
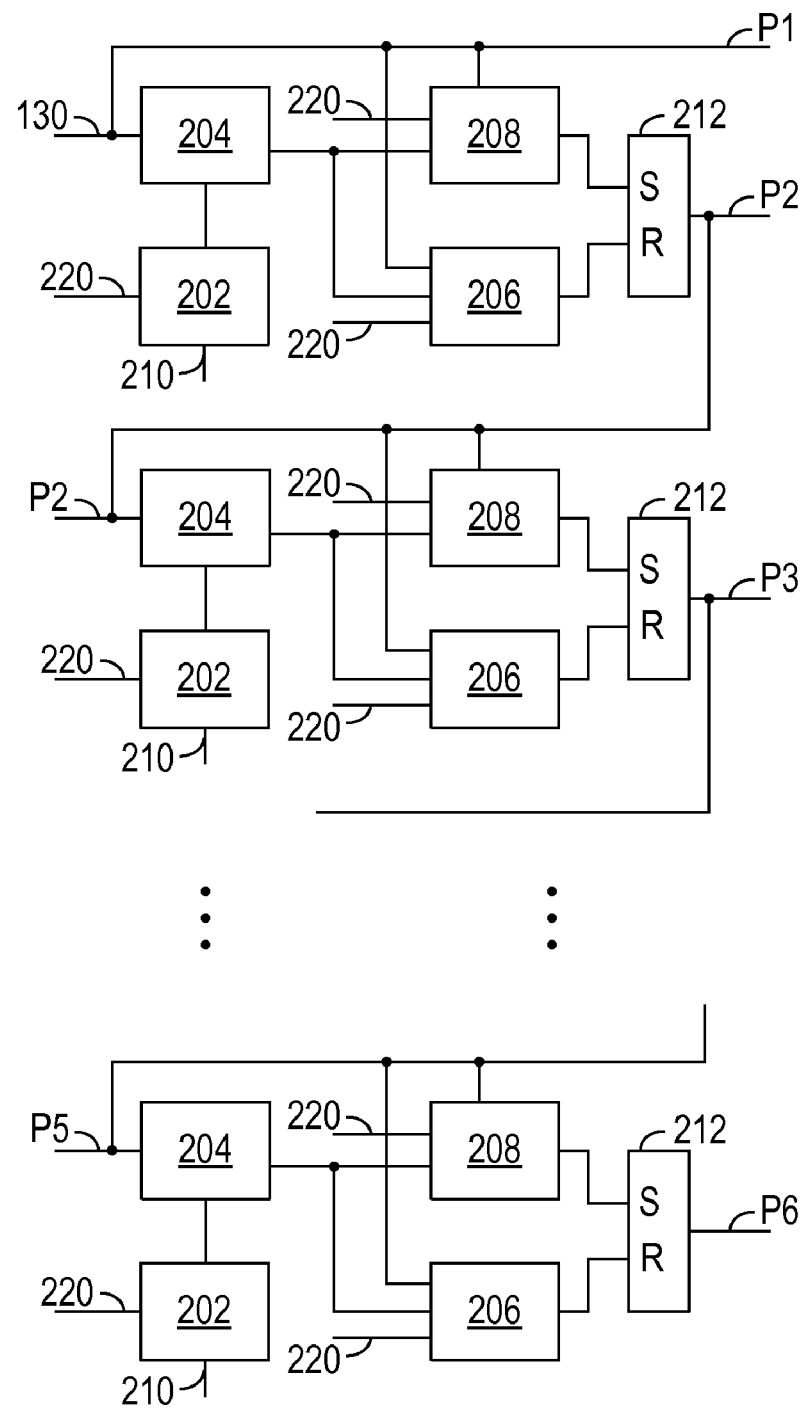
FIG. 2A illustrates an exemplary diagram of a phase array circuitry of FIG. 1, in accordance with one embodiment of the present invention.

FIG. 2A illustrates an exemplary diagram of a phase array circuitry 146 of FIG. 1, in accordance with one embodiment of the present invention. The phase array circuitry 146 can receive the dimming control signal 130 and can generate the plurality of (burst-mode) phase shift signals P1-P6 depending on the total number N of operative LED strings among LED strings 160_1-160_6. In the example of FIG. 2A, the phase array circuitry 146 includes a plurality of PWM period counters 204, a plurality of PWM rising edge counters 208, a plurality of PWM falling edge counters 206, a plurality of phase number controllers 202, and a plurality of latches 212. Not all of the PWM period counters 204, PWM rising edge counters 208, PWM falling edge counters 206, phase number controllers 202, and latches 212 are shown in FIG. 2A for purposes of brevity and clarity.

In one embodiment, each phase number controller 202 receives a code signal 210 indicative of the total number N of the operative LED strings among the plurality of LED strings 160_1-160_6. The code signal 210 can be a multi-bit signal and the length of the code signal 210 can depend on the number of LED strings 160_1-160_6. For example, if there are six LED strings 160_1-160_6 in the light source array 160 as shown in FIG. 1, the code signal 210 can be a 3-bit signal. In one embodiment, the code signal 210 as "110" indicates that all the six LED strings 160_1-160_6 are in operation, the code signal 210 as "101" indicates that five LED strings are in operation, the code signal 210 as "100" indicates that four LED strings are in operation, the code signal 210 as "011" indicates that three LED strings are in operation, and the code signal 210 as "010" indicates that two LED strings are in operation.

In one embodiment, each phase number controller 202 receives the code signal 210 and a main clock signal 220, and generates a divided clock signal by dividing the main clock signal 220 by N. N represents the total number of the operative LED strings among LED strings 160_1-160_6. In the example of FIG. 2A, the dimming control signal 130 is a pulse width modulation signal and the first phase shift signal P1 can be the same as the dimming control signal 130. In one embodiment, each PWM period counter 204 receives the divided clock signal from the corresponding phase number controller 202 and receives a corresponding phase shift signal P1, P2, P3, P4, or P5, and generates an output signal indicative of a period of the corresponding phase shift signal P1, P2, P3, P4, or P5. In one embodiment, the period of the phase shift signals P1-P6 is the same as that of the dimming control signal 130. The PWM rising edge counter 208 and the PWM falling edge counter 206 receive the output signal from the PWM period counter 204 and the main clock signal 220, and generate output signals indicating the number of rising edges and the number of falling edges respectively, in one embodiment. Each latch 212 receives output signals from the corresponding PWM rising edge counter 208 and the corresponding PWM falling edge counter 206, and generates a corresponding phase shift signal P2, P3, P4, P5, or P6.

In one embodiment, the phase shift signal P1 can be the same as the dimming control signal 130. The phase shift signal P2 can be generated by the corresponding PWM period counter 204, the corresponding PWM rising edge counter 208, the corresponding PWM falling edge counter 206, and the corresponding latch 212. The phase shift signals P3-P6 can be generated in a similar way. Advantageously, the total number of the phase shift signals generated by the phase array circuitry 146 is equal to the total number N of the operative LED strings among LED strings 160_1-160_6, and the amount of phase shift between two adjacent phase shift signals (e.g., between P1 and P2) is equal to 360/N degrees, in one embodiment. If one or more LED strings are not operating (e.g., when one or more LEDs in the corresponding LED string are damaged or opened), the phase array circuitry 146 can automatically adjust the phase shift signals such that the total number of the phase shift signals generated by the phase array circuitry 146 will be equal to the total number N of operative LED strings and the amount of phase shift between any two adjacent phase shift signals (e.g., between P1 and P2) is the same, in one embodiment.

Figure 2B:
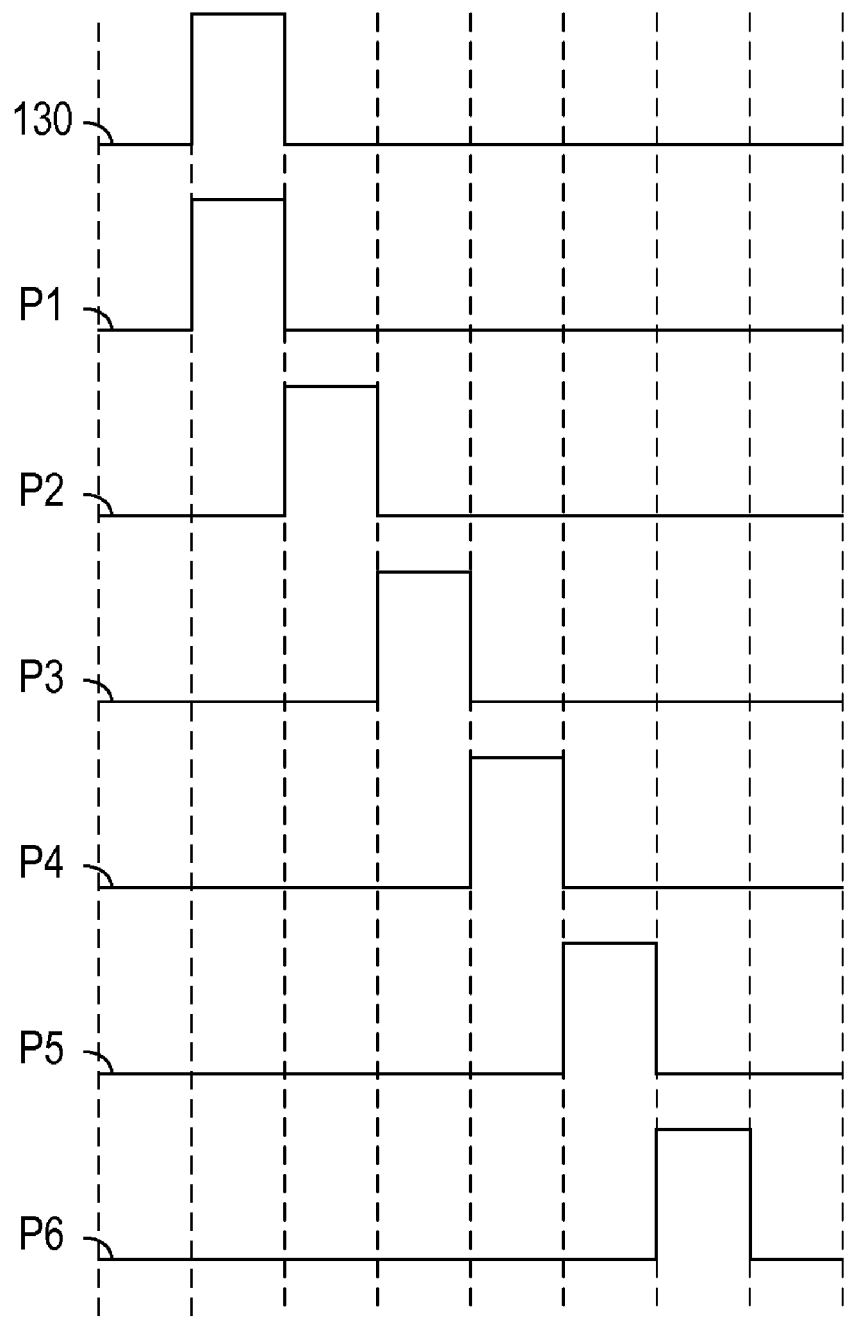
FIG. 2B illustrates an exemplary plot for the phase shift signals generated by the phase array circuitry, in accordance with one embodiment of the present invention.

FIG. 2B shows an exemplary plot of the phase shift signals P1-P6 generated by the phase array circuitry 146 when LED strings 160_1-160_6 are all in normal operation, in accordance with one embodiment of the present invention. As shown in the example of FIG. 2B, the phase shift signal P1 can be the same as the dimming control signal 130. The phase shift between P2 and P1, between P3 and P2, between P4 and P3, between P5 and P4, between P6 and P5 is the same, in one embodiment. Therefore, the LEDs strings 160_1-160_6 can be burst on and off at a different time based on phase shift signals P1-P6 generated by the phase array circuitry 146. If one LED string among LED strings 160_1-160_6 is not operating, then only five phase shift signals P1-P5 will be generated, in one embodiment. If two LED strings among LED strings 160_1-160_6 are not operating, then only four phase shift signals P1-P4 will be generated, in one embodiment.

Figure 2C:
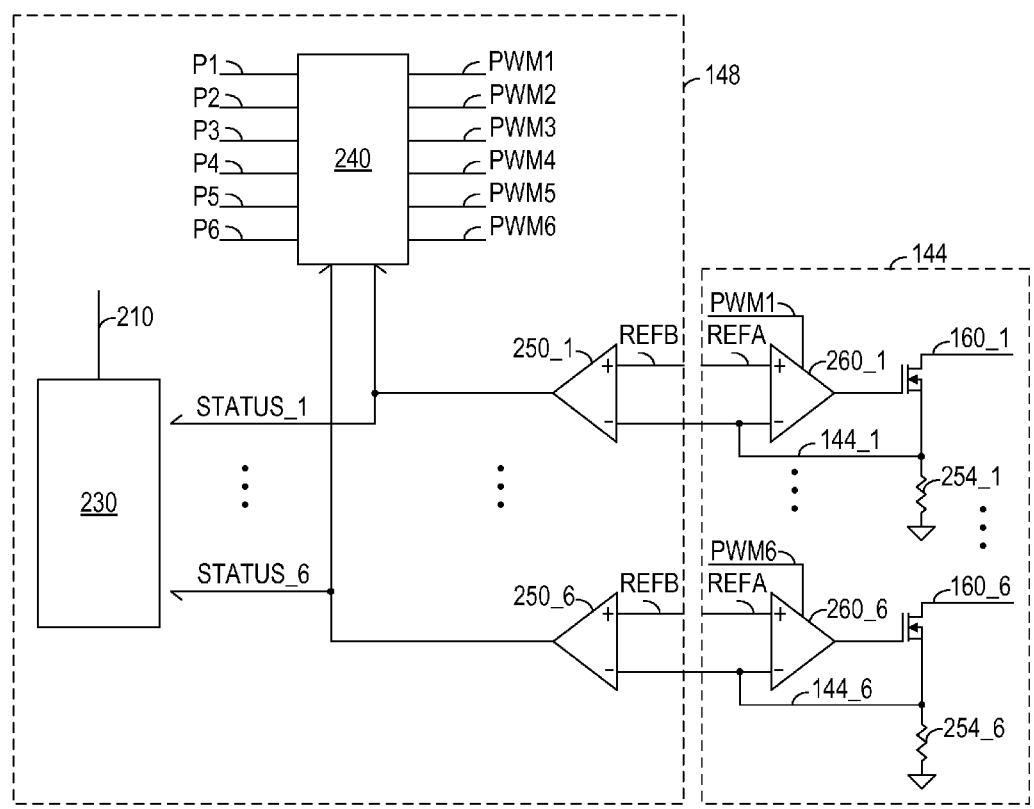
FIG. 2C illustrates an exemplary diagram of a feedback circuitry and an encoder circuitry of FIG. 1, in accordance with one embodiment of the present invention.

FIG. 2C illustrates an exemplary diagram of a feedback circuitry 144 and an encoder circuitry 148 of FIG. 1, in accordance with one embodiment of the present invention. The feedback circuitry 144 includes a plurality of sense resistors 254_1-254_6 (not all the sense resistors 254_1-254_6 are shown in FIG. 2C for purposes of brevity and clarity), in one embodiment. The feedback circuitry 144 can generate the plurality of feedback signals 144_1-144_6 indicative of the plurality of currents flowing through LED strings 160_1-160_6 respectively by monitoring voltages on resistors 254_1-254_6. In one embodiment, the feedback circuitry 144 further includes a plurality of comparators 260_1-206_6 (not all the comparators 260_1-206_6 are shown in FIG. 2C for purposes of brevity and clarity). Each comparator 260_1-206_6 compares a corresponding feedback signal 144_1-144_6 with a predetermined reference signal REFA and generates a control signal for controlling a corresponding switch. In one embodiment, the control signal is an analog signal and controls the switch (e.g., a MOSFET) linearly such that the current flowing through the corresponding LED string can be adjusted according to the predetermined reference signal REFA. As such, the currents flowing through the LED strings 160_1-160_6 can be adjusted according to the predetermined reference signal REFA.

The feedback circuitry 144 is further capable of balancing the currents flowing through the plurality of LED strings 160_1-160_6 respectively by a balancing circuit (not shown in FIG. 3C for purposes of brevity and clarity). More specifically, the feedback circuitry 144 is capable of comparing a current flowing through one LED string to currents flowing through other LED strings. For example, the current flowing through the LED string 160_1 can be adjusted based upon a difference between the current flowing through the LED string 160_1 and the current flowing though another LED string.

In one embodiment, the encoder circuitry 148 includes a plurality of comparators 250_1-250_6 (not all the comparators 250_1-250_6 are shown in FIG. 2C for purposes of brevity and clarity). Each comparator 250_1-250_6 receives a corresponding feedback signal 144_1-144_6 indicative of a corresponding current flowing through a corresponding LED string 160_1-160_6 and compares the corresponding feedback signal 144_1-144_6 with a predetermined reference signal REFB. As such, each comparator 250_1-250_6 can generate a corresponding status indication signal status_1-status_6 indicating whether a corresponding LED string is in operation or not according to a comparison result. In one embodiment, if the LED string is operative, the corresponding comparator 250_1-250_6 can generate a low level status indication signal. If the LED string is not operating (e.g., damaged or disconnected), the corresponding comparator 250_1-250_6 can generate a high level status indication signal.

The encoder circuitry 148 can further include a phase number encoder 230 for receiving the plurality of status indication signals status_1-status_6 and for generating the code signal 210 according to the plurality of status indication signals status_1-status_6. As described in relation to FIG. 2A, the code signal 210 representing the total number N of the operative LED strings can be provided to each phase number controller 202 in the phase array circuitry 146. The encoder circuitry 148 can have different configurations as long as it can provide the code signal 210 representing the total number of LED strings in operation.

The encoder circuitry 148 can further include a multiplexer 240 coupled to the phase number encoder 230 and for receiving the plurality of phase shift signals (e.g., P1-P6 depends on the total number of LED strings in operation) and the plurality of status indication signals status_1-status_6, and for generating a plurality of pulse width modulation signals (e.g., PWM1-PWM6 depends on the total number of LED strings in operation) as burst-mode signals for properly controlling the dimming of the LED strings 160_1-160_6, in one embodiment.

During operation, for example, the LED string 160_4 is disconnected, then the status indication signal status_4 will be "high" while other status indication signals status_1-status_3, and status_5-status_6 are "low". Meanwhile, the encoder circuitry 148 outputs the code signal as "101" indicating that only five strings of LEDs are operating. As a result, the phase array circuitry 146 receives the code signal 210 and generates five phase shift signals P1-P5 based on the DIM control signal 130 (e.g., a pulse width modulation signal). In one embodiment, the phase shift signals P1-P5 are multiplexed with the status indication signals status_1-status_6 by the multiplexer 240 in order to generate five equally phase shift burst-mode PWM signals PWM1, PWM2, PWM3, PWM5, and PWM6 which can be used for controlling LED strings 160_1, 160_2, 160_3, 160_5, and 160_6 respectively. The phase shift between PWM1 and PWM2, between PWM2 and PWM3, between PWM5 and PWM3, between PWM6 and PWM5 is equal to 360/N=72 degrees (N=5), in one embodiment. Advantageously, the power line ripple current can be reduced during the burst-mode dimming control.

Figure 3:
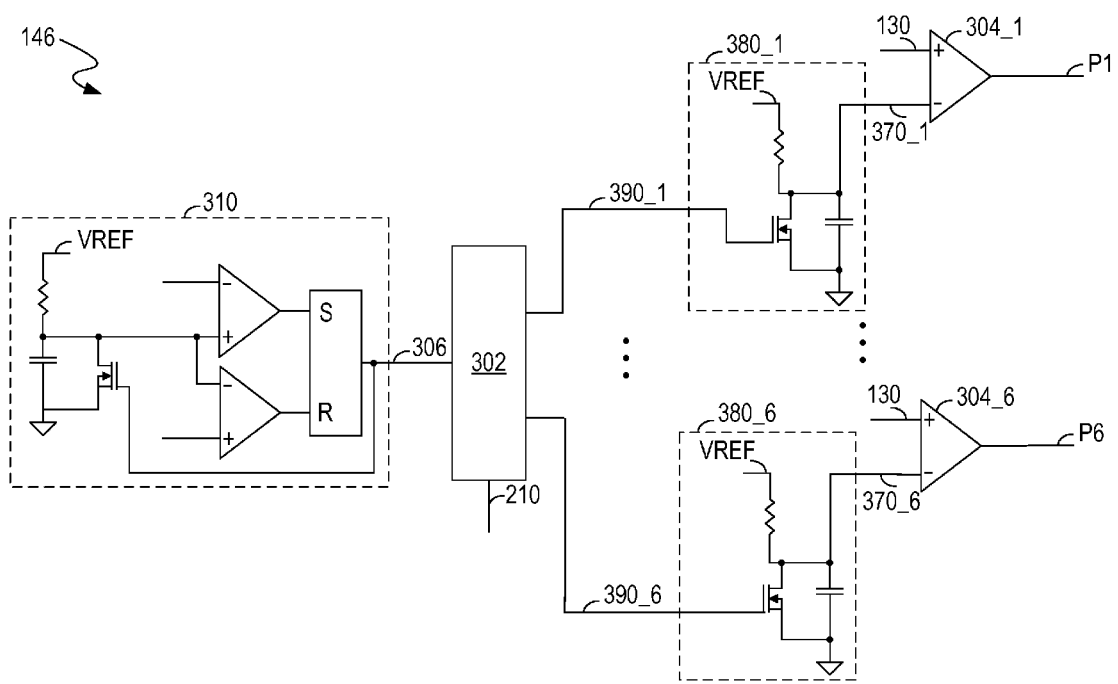
FIG. 3 illustrates another exemplary diagram of a phase array circuitry of FIG. 1, in accordance with one embodiment of the present invention.

FIG. 3 illustrates another exemplary diagram of the phase array circuitry 146 of FIG. 1, in accordance with one embodiment of the present invention. The phase array circuitry 146 includes an oscillation circuit 310 for generating an oscillation signal 306, e.g., a periodical pulse signal. As shown in the example of FIG. 3, the oscillation circuitry 310 receives a reference voltage VREF and includes an RC circuit, two comparators, and a latch. However, the oscillation circuit 310 can have many other configurations and will not be detailed described herein for purposes of brevity and clarity. The oscillation signal 306 can be received by a frequency divider 302. The frequency divider 302 receives the code signal 210 which indicates a total number N of the operative LED strings and receives the oscillation signal 306. In one embodiment, the frequency divider 302 divides the oscillation signal 306 by N and provides a plurality of phase shift pulse signals. The total number of phase shift pulse signals (e.g., 390_1-390_6) generated by the frequency divider 302 is equal to the total number N of the operative LED strings (not all the phase shift pulse signals 390_1-390_6 are shown in FIG. 3 for purposes of brevity and clarity). In one embodiment, a phase shift amount between two adjacent phase shift pulse signals, e.g., between 390_1 and 390_2, is equal to 360/N degrees. For example, the phase shift pulse signal 390_1 can be a signal that is directly obtained by dividing the oscillation signal 306 by N, and the phase shift pulse signal 390_2 can be a signal that is obtained by shifting the phase shift pulse signal 390_1 by a phase shift.

Each phase shift pulse signal 390_1-390_6 is further sent to a corresponding RC circuit 380_1-380_6 (not all the RC circuits 380_1-380_6 are shown in FIG. 3 for purposes of brevity and clarity). Consequently, each RC circuit 380_1-380_6 can generate a corresponding saw tooth signal 370_1-370_6. Similarly, a phase shift amount between two adjacent saw tooth signals, e.g., between 370_1 and 370_2, can be equal to 360/N degrees. In one embodiment, the phase array circuitry 146 further includes a plurality of comparators 304_1-304_6. Each comparator 304_1-304_6 compares a corresponding saw tooth signal 304_1-304_6 with the dimming control signal 130. In the example of FIG. 3, the dimming control signal 130 is an analog voltage signal. Consequently, the plurality of phase shift signals (e.g., P1-P6) can be generated by comparators 304_1-304_6 respectively. The number of the phase shift signals (e.g., P1-P6) generated by comparators 304_1-304_6 is equal to the total number N of the operative LED strings, in one embodiment.

Figure 4:
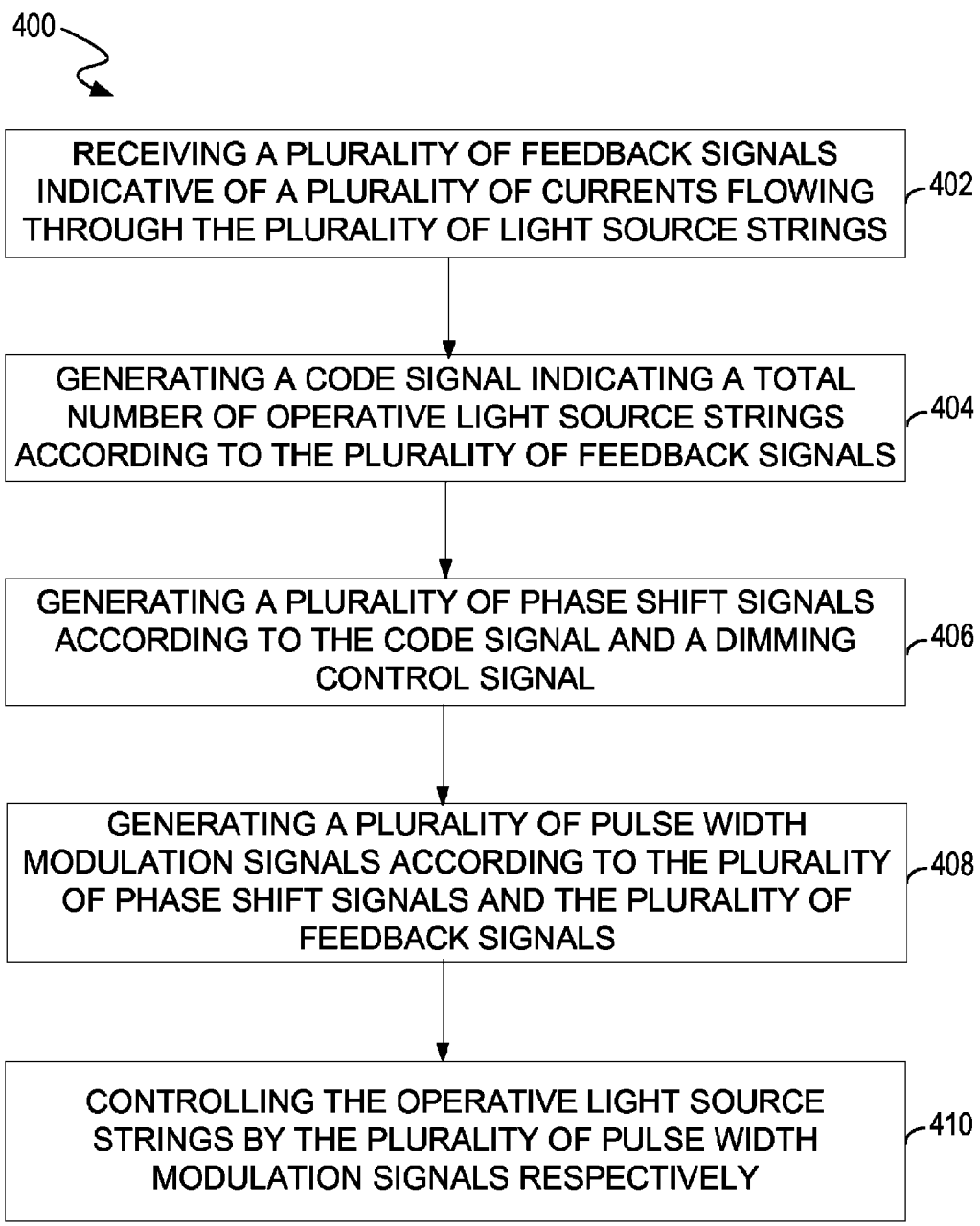
FIG. 4 illustrates a flowchart of operations performed by a backlight controller, in accordance with one embodiment of the present invention.

FIG. 4 shows a flowchart 400 of operations performed by a backlight controller for driving a plurality of light source strings, in accordance with one embodiment of the present invention. FIG. 4 is described in combination with FIG. 1, FIG. 2A, FIG. 2C, and FIG. 3. Although specific steps are disclosed in FIG. 4, such steps are exemplary. That is, the present invention is well suited to performing various other steps or variations of the steps recited in FIG. 4.

In block 402, a plurality of feedback signals 144_1-144_6 indicative of a plurality of currents flowing through the plurality of light source strings 160_1-160_6 respectively can be generated by the feedback circuitry 144. In block 404, a code signal 210 indicative of a total number N of operative light source strings among the plurality of light source strings 160_1-160_6 can be generated according to the plurality of feedback signals 144_1-144_6 by the encoder circuitry 148. In block 406, a plurality of phase shift signals (e.g., P1-P6) can be generated according to the code signal 210 and a dimming control signal 130 by the phase array circuitry 146. In block 408, a plurality of pulse width modulation signals (e.g., PWM1-PWM6) can be generated according to the plurality of phase shift signals (e.g., P1-P6) and the plurality of feedback signals 144_1-144_6 by the encoder circuitry 148. In block 410, the operative light source strings can be controlled by the pulse width modulation signals (e.g., PWM1-PWM6) respectively.

Accordingly, in one embodiment, an adaptive backlight controller in a display system for driving a plurality of light source strings, e.g., LED strings, is provided. Advantageously, the backlight controller can detect which light source string is in operation and can provide automatic phase shift adjustments according to the total number of the operative light source strings such that the burst-mode dimming control can be optimized, in one embodiment.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A backlight controller for driving a plurality of light emitting diode (LED) strings, said backlight controller comprising:
    feedback circuitry generating a plurality of feedback signals indicative of a plurality of currents flowing through said plurality of LED strings respectively;
    encoder circuitry coupled to said feedback circuitry, said encoder circuitry generating a code signal indicative of a total number of operative LED strings among said plurality of LED strings based on said feedback signals; and
    phase array circuitry coupled to said encoder circuitry, said phase array circuitry generating a plurality of saw tooth signals according to said code signal, wherein a phase shift amount between two adjacent signals of said plurality of saw tooth signals is determined by the total number of said operative LED strings, and wherein said phase array circuitry compares each of said saw tooth signals with a dimming control signal to generate a plurality of phase shift signals so as to respectively control said operative LED strings,
    wherein said phase array circuitry further comprises:
        a frequency divider dividing an oscillation signal according to said code signal to generate a plurality of phase shift pulse signals; and
        control circuits coupled to said frequency divider, said control circuits converting said plurality of phase shift pulse signals to said plurality of saw tooth signals, respectively.

2. The backlight controller as claimed in claim 1, wherein said encoder circuitry further comprises:
    a multiplexer multiplexing said phase shift signals based on said feedback signals to generate a plurality of pulse-width modulation signals and transferring said pulse-width modulation signals to said operative LED strings, respectively.

3. The backlight controller as claimed in claim 1, wherein said dimming control signal comprises an analog voltage signal.

4. The backlight controller as claimed in claim 1, wherein the number of said saw tooth signals is equal to the total number of said operative LED strings.

5. The backlight controller as claimed in claim 1, wherein the phase shift amount between two adjacent saw tooth signals is equal to 360/N, where N represents the total number of said operative LED strings.

6. The backlight controller as claimed in claim 1, wherein said phase array circuitry further comprises:
- a plurality of comparators comparing each feedback signal of said plurality of feedback signals to a predetermined reference signal, and adjusting said plurality of currents according to a result of said comparison.

7. The backlight controller as claimed in claim 1, wherein said encoder circuitry further comprises:
- a plurality of comparators comparing each feedback signal of said plurality of feedback signals to a predetermined reference signal, and generating a plurality of status indication signals indicating which LED string among said plurality of LED strings is operative according to a result of said comparison, wherein said code signal is generated according to said status indication signals.

8. A method for driving a plurality of light emitting diode (LED) strings, comprising:
- receiving a plurality of feedback signals indicative of a plurality of currents flowing through said plurality of LED strings, respectively;
- generating a code signal indicative of a total number of operative LED strings among said plurality of LED strings based on said feedback signals;
- generating a plurality of saw tooth signals according to said code signal, wherein a phase shift amount between two adjacent signals of said plurality of saw tooth signals is determined by the total number of said operative LED strings;
- comparing each of said saw tooth signals with a dimming control signal to generate a plurality of phase shift signals;
- controlling said operative LED strings according to said phase shift signals, respectively;
- dividing an oscillation signal according to said code signal to generate a plurality of phase shift pulse signals; and
- converting said plurality of phase shift pulse signals to said plurality of saw tooth signals, respectively.

9. The method as claimed in claim 8, further comprising:
- multiplexing said phase shift signals based on said feedback signals to generate a plurality of pulse-width modulation signals; and
- transferring said pulse-width modulation signals to said operative LED strings, respectively.

10. The method as claimed in claim 8, wherein said dimming control signal comprises an analog voltage signal.

11. The method as claimed in claim 8, wherein the number of said saw tooth signals is equal to the total number of said operative LED strings.

12. The method as claimed in claim 8, wherein the phase shift amount between two adjacent saw tooth signals is equal to 360/N, where N represents the total number of said operative LED strings.

13. The method as claimed in claim 8, further comprising:
- comparing each feedback signal of said plurality of feedback signals to a predetermined reference signal; and
- adjusting said plurality of currents according to a result of said comparison.

14. The method as claimed in claim 8, further comprising:
- comparing each feedback signal of said plurality of feedback signals to a predetermined reference signal;
- generating a plurality of status indication signals indicating which LED string among said plurality of LED strings is operative according to a result of said comparison; and
- generating said code signal according to said status indication signals.

15. A display system comprising:
- a plurality of light emitting diode (LED) strings;
- a backlight controller coupled to said LED strings, said backlight controller detecting operative LED strings among said plurality of LED strings, and said backlight controller receiving a dimming control signal and generating a plurality of phase shift signals by comparing a plurality of saw tooth signals to said dimming control signal, wherein a phase shift amount between two adjacent signals of said plurality of saw tooth signals is determined by a total number of said operative LED strings, and wherein said backlight controller adjusts phase shifts of currents through said operative LED strings based on said phase shift signals; and
- a divider dividing an oscillation signal to a plurality of phase shift pulse signals according to the total number of the operative LED strings,
- wherein said plurality of saw tooth signals are generated according to said phase shift pulse signals.

16. The display system as claimed in claim 15, wherein said dimming control signal comprises an analog voltage signal.

17. The display system as claimed in claim 15, wherein the number of said saw tooth signals is equal to the total number of said operative LED strings, and wherein the phase shift amount between said two adjacent signals is equal to 360/N, where N represents the total number of said operative LED strings.

* * * * *